Figure 1:
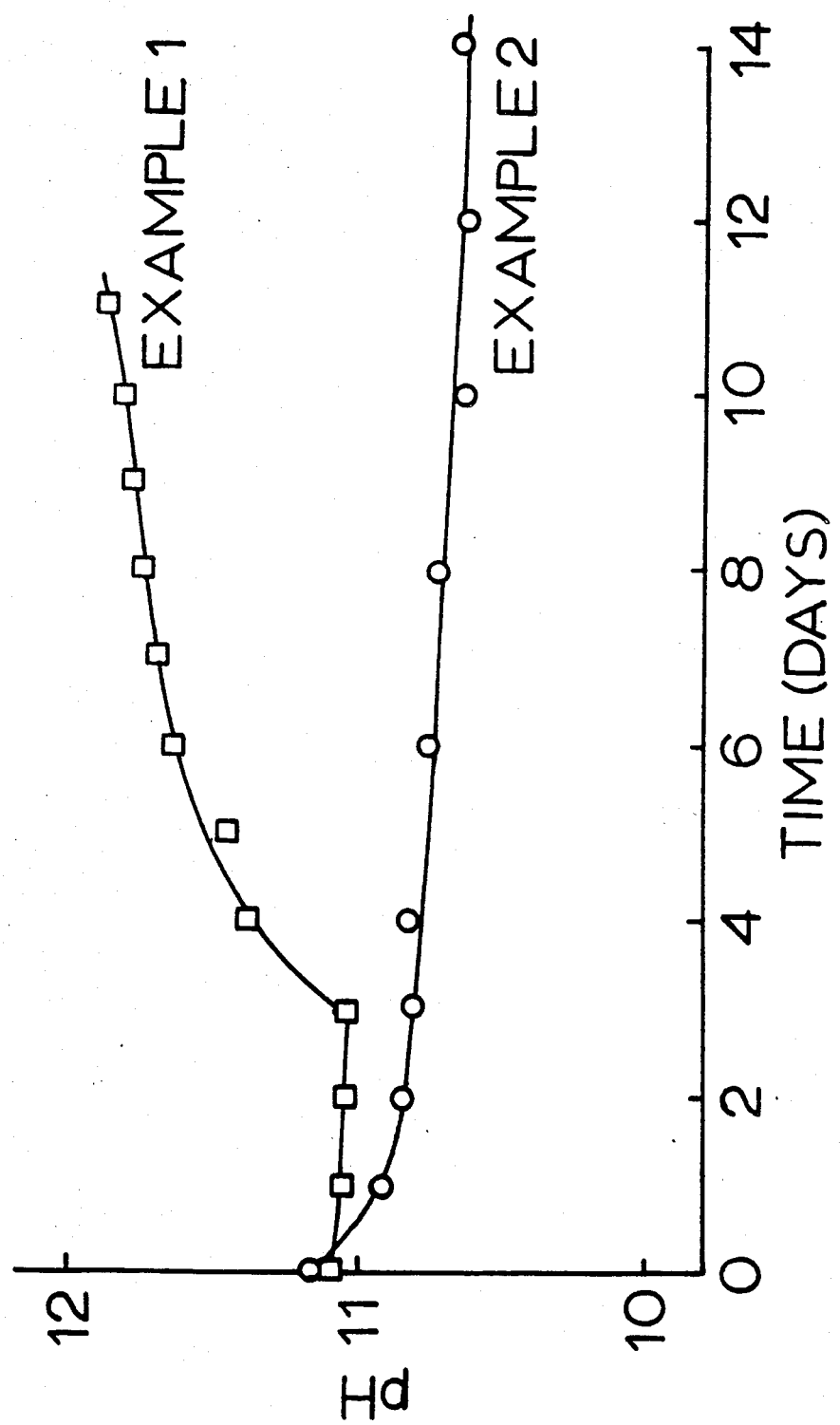

United States Patent [19]

Lowe et al.

[11] Patent Number: 4,680,170

[45] Date of Patent: Jul. 14, 1987

[54] SYNTHESIS OF ZEOLITIC MATERIALS USING ION-EXCHANGE RESIN

[75] Inventors: Barrie M. Lowe, Edinburgh, Scotland; Stuart G. Fegan, Pretoria, South Africa

[73] Assignee: Imperial Chemical Industries PLC, England

[21] Appl. No.: 721,605

[22] Filed: Apr. 10, 1985

[30] Foreign Application Priority Data

Apr. 10, 1984 [GB] United Kingdom ............... 8409285

[51] Int. Cl.[4] ............................................ C01B 33/28
[52] U.S. Cl. .................................... 423/329; 423/277; 423/326; 423/330; 423/335; 423/339; 423/328; 502/60; 502/62; 502/77
[58] Field of Search ............... 423/328, 329, 335, 339; 502/62, 77, 60, 232

[56] References Cited

U.S. PATENT DOCUMENTS

| | | | |
|---|---|---|---|
| 4,061,724 | 12/1977 | Grose et al. ........................ | 423/339 |
| 4,217,240 | 8/1980 | Bergna .............................. | 423/328 |
| 4,257,885 | 3/1981 | Grose et al. ........................ | 502/60 |
| 4,512,961 | 4/1985 | Scherzer et al. .................... | 423/328 |

FOREIGN PATENT DOCUMENTS

| | | | |
|---|---|---|---|
| 0055046 | 6/1982 | European Pat. Off. ............ | 423/328 |
| 0093519 | 11/1983 | European Pat. Off. ............ | 423/328 |
| 0178687 | 4/1986 | European Pat. Off. ............ | 502/77 |
| 0207184 | 2/1984 | Fed. Rep. of Germany ...... | 423/328 |

OTHER PUBLICATIONS

J. L. Casci and B. M. Lowe, "use of pH Measurements to Monitor Zeolite Crystallization", *Zeolites*, vol. 3, No. 3, Jul. 1983, pp. 186–187.

*The Condensed Chemical Dictionary*, Tenth Edition, Revised by Gessner G. Hawley, Von Nostrand Reinhold Co., 1981.

Kuei-Jung Chao et al, "Kinetic Studies on the Formation of ZSM-J", J. Chem. Soc., Faraday Trans. 1, 1981, 77, 547–555.

*Primary Examiner*—John Doll
*Assistant Examiner*—Jackson Leeds
*Attorney, Agent, or Firm*—Cushman, Darby & Cushman

[57] ABSTRACT

Crystalline zeolites and zeolitic materials are prepared by crystallization from an aqueous mixture comprising a source of silica, optionally a source of alumina, and an ion-exchange resin preferably an anion-exchange resin. In a preferred form of the invention the anion-exchange resin is in the hydroxide form and the reaction mixture also contains a quaternary ammonium compound.

11 Claims, 1 Drawing Figure

SYNTHESIS OF ZEOLITIC MATERIALS USING ION-EXCHANGE RESIN

The present invention relates to improved methods for the synthesis of zeolites and similar materials.

Zeolites have been known for very many years but interest in their use as molecular sieves and as catalysts has increased very considerably over the last 30 years. Many zeolites occur in nature and in recent years many synthetic zeolites have also been prepared. The technical literature of the last 25 years or so is replete with descriptions of new zeolites and of their preparation and with proposals for the use of zeolites, both old and new, as catalysts and as sorbents in a wide variety of chemical processes. Many of these proposals relate to the use of zeolites in processes used in the oil and petrochemical industry such as aromatisation, hydrocarbon cracking, isomerisation processes and the like.

Zeolites, both natural and synthetic, include a considerable number of cation-containing crystalline aluminosilicates which can be characterised as rigid three-dimensional frameworks of $SiO_4$ and $AlO_4$ in which the tetrahedra are cross-linked by the sharing of oxygen atoms whereby the ratio of the total aluminium and silicon atoms to oxygen is 1:2. The electrovalence of the tetrahedra containing aluminium is balanced by the inclusion in the crystal of a suitable cation.

In recent years, zeolitic materials containing little or no aluminium in their frameworks have also been described and prepared. These materials which have been described as crystalline silica polymorphs and as open framework crystalline silicas have rigid, three-dimensional networks of $SiO_4$ tetrahedra in which the tetrahedra are cross-linked by the sharing of oxygen atoms. The open-framework crystalline silicas are substantially free of alumina, but they may contain minor amounts of alumina resulting from impurities in the starting materials or contamination of the manufacturing equipment. The silica/alumina mole ratio of open-framework crystalline silicas is typically greater than about 200:1 and one such material has been given the name "Silicalite".

Zeolites and similar zeolitic materials are usually prepared by crystallisation from aqueous reaction mixtures containing sources of silica and, where necessary, alumina. Many such reaction mixtures are prepared using strong bases, particularly alkali metal and quaternary ammonium hydroxides although weak bases are sometimes used in other cases. The nature of the quaternary ammonium and/or other organic base used as well as the mole ratios of the various reactants in the reaction mixture have considerable influence on the zeolite or zeolitic material which is obtained. It is not unusual to obtain more than one zeolitic product from a reaction mixture and it may alo happen that non-zeolitic crystalline materials and/or amorphous products are obtained. The preparation, therefore of a sufficiently pure zeolitic product in good yield is a problem constantly encountered by those in the zeolitic art. The Applicants believe that the method of this invention will help to reduce the difficulties inherent in the preparation of zeolites and zeolitic material.

Accordingly the present invention provides a method for the preparation of a crystalline zeolite or zeolitic material which comprises reacting an aqueous mixture comprising at least one source of silica and an ion-exchange resin.

In a preferred form of the method of this invention the ion-exchange resin is an anion-exchange resin. In this preferred form the anion-exchange resin is conveniently in the $OH^-$ form and thereby any desired amount of base may be supplied to the reaction mixture. However, as circumstances require, the anion-exchange resin may be added in other forms, for example in the chloride form.

The Applicants believe that when the aqueous reaction mixture contains an anion-exchange resin the changes of pH that commonly occur during zeolite synthesis are much reduced because the resin provides buffer capacity to cope with changes in hydroxide ion concentration through its exchange equilibria. Crystal growth can thereby occur at nearly constant pH for the entire duration of the reaction and the zeolite crystals are substantially uniform in size and composition. Secondary nucleation and nucleation of impurity species are reduced compared with equivalent systems lacking the presence of an anion-exchange resin. In addition, the decomposition which tends to occur at high pH of some quaternary ammonium compounds (which are frequently used in the synthesis of zeolitic materials) can be reduced by maintaining the pH substantially constant at relatively low pH.

The Applicants further believe that in some systems the surface of the resin may promote nucleation and reduce reaction times. The rise in pH associated with zeolite crystallisation in conventional systems is much reduced and the lower final reaction pH enables a larger product yield to be obtained.

This preferred form of the method of the invention is of particular benefit in the synthesis of high silica zeolites, zeolitic materials and molecular sieves in systems which are substantially free of metal cations. Certain of these species require the presence of quaternary ammonium ions ($Q^+$) for crystallisation to occur. Conventionally, reaction mixtures are prepared using either (a) quaternary ammonium hydroxides ($Q^+OH^-$) or (b) alkali metal hydroxides with a quaternary ammonium salt, for example sodium hydroxide $+Q^+Br^-$. There are disadvantages associated with both these systems. System (a) is sometimes preferred to system (b) because the zeolitic products are free from alkali metal cations but system (b) is more expensive (quaternary hydroxides cost more than quaternary salts) and wasteful as much of the quaternary remains in the mother liquor. The use of an anion-exchange resin in the hydroxide form ($Res^+OH^-$) according to the method of this invention in conjunction with a quaternary salt (for example $Q_+Br^-$) effectively produces the alkalinity required for crystallisation. (It is also easier to use the hydroxide-form resin and quaternary salt than it is to use previously prepared quaternary ammonium hydroxide). The as-synthesised products, being free of alkali metal cations, have improved purity. The ion-exchange resin is readily separated from the zeolitic product and easily regenerated with cheap aqueous alkali metal hydroxide.

In this preferred form of the method of this invention the anion exchange resin may be added to the reaction mixture either before or after or simultaneously with other components of the reaction mixture. For example, it may be convenient to add anion-exchange resin during crystallisation so as to supress the final pH rise commonly observed in conventional zeolite crystallisations. Anion exchange resins tend to decompose with increasing temperature and aqueous reaction mixtures comprising anion-exchange resins are suitably crystallised at maximum temperatures no greater than the decomposition temperature of the resin (typically about 100° C.).

Further advantageous aspects of the use of anion exchange resins in the synthesis of zeolites and zeolitic materials are believed to include the ability to produce buffered systems of higher pH value than those readily achieved with other buffering agents. In addition, perturbation of the crystallisation process, which can occur when weak acid buffer systems containing large salt concentrations are used, is avoided. Use of the anion exchange resin in its hydroxide form may result in silicate ions and aluminate ions, if present, becoming bound to the resin thereby providing better control of the ions' solution phase distribution and hence their distribution in the zeolite. Both ions could be introduced to the aqueous reaction mixture on the resin.

The Applicants believe that the method of this invention could have advantages in the preparation of two specific forms of the zeolitic material known as "Silicalite". During the synthesis of "Silicalite-1" (UK Pat. Spec No. 2,084,552) from reaction mixtures prepared from sodium hydroxide and tetra-propyl ammonium compounds sodium ions are incorporated into the molecular sieve, leading to a reduction in thermal stability and hydrophobicity. Use of the preferred method of this invention avoids the use of sodium compounds and thereby avoids this disadvantage. A similar deleterious incorporation of alkali metal ions into the zeolitic material occurs in the synthesis of "Fluoride-Silicalite" (U.S. Pat. No. 4,073,865) when the fluoride is added to the reaction mixture as an alkali metal salt. Use of an anion-exchange resin in the fluoride form instead of an alkali metal compound would avoid this difficulty.

In a further preferred form of the method of this invention the ion-exchange resin comprises a cation-exchange resin.

The Applicants believe that the use of cation-exchange resins may provide the following advantages in appropriate cases. For example, in the synthesis of a high silica zeolite or zeolitic material the $Na^+/Q^+$ ratio (where Q has the same meaning as hereinabove defined) may be stabilised in such a way as to achieve a substantially uniform cation distribution throughout the products. This cation ratio can control either nucleation or crystal growth and thereby the crystal size and morphology.

In other cases the binding of impurity cations on to the resin will enable a purer zeolitic product to be obtained.

In the synthesis of some aluminosilicate zeolites, it is convenient to add at least some of the aluminium required to the reaction mixture in the cationic form bound to the resin. Cation exchange also provides a means of introducing unstable quaternary ammonium compounds to the reaction mixture. A quaternary bound to the resin is less likely to decompose than if it was in the solution phase and this is advantageous in the synthesis of zeolites which involve the use of such cations as the tetraethylammonium cation, for example zeolites beta, ZSM-12 and ZSM-20.

In a further preferred form of the method of this invention the ion-exchange resin comprises a mixture of at least one anion-exchange resin and at least one cation exchange resin. The use of mixtures of cation- and anion-exchange resins may be advantageous in the growth of large zeolitic crystals in that, if desired, substantially all the components required for the synthesis may be bound to ion exchange resins and added in this form to an inert electrolyte solution for crystallisation in the usual way.

In the method of this invention the sources of silica, alumina when required, and other optional constituents of the reaction mixture for example organic template compounds, are selected from those commonly used in the zeolite art and appropriate to the synthesis of the required zeolite. These sources are well documented in the extensive technical literature relating to the synthesis of zeolites and zeolitic materials.

The method of this invention is further described in the following Examples.

EXAMPLE 1

90 g BDH Dowex 1-XB(Cl) resin was placed in a column and converted to the $OH^-$ form by passing 10 mls 1M NaOH/g resin down the column. The resin was then well washed with glass distilled water. Solution A was prepared by adding 33.35 g dilica (CABOSIL M5,) to 250 g glass distilled water. The mixture was stirred until homogeneous. Solution B was prepared by adding 90 g of the resin to a solution of tetrapropylammonium bromide (TPABr) (14.78 g) in water (250 g). After stirring at 95° C. for 1 hour the pH was found to be ~13. 19.73 g sodium sulphate was then added and the mixture was stirred for a further hour at 95° C. The pH was measured to be ~13.

Solution A was then added to solution B.

The overall reaction composition of the reaction mixture was: 3243 g Resin. $2TPABr.20SiO_2.5Na_2SO_4.1000H_2O$.

The reaction conditions were: polypropylene bottles, stirred 150 rpm, 95° C.

The reaction was terminated after 11 days. The change in pH during the reaction was +0.80 (see FIG. 1). X-ray powder diffraction showed the product to be 100% "Silicalite".

EXAMPLE 2

A reaction mixture was prepared as for example 1 except that no $Na_2SO_4$ was used. Reaction conditions were as for example 1.

The overall composition of the reaction mixture was: 3243 g Resin.$2TPABr.20SiO_2.1000H_2O$.

The reaction was terminated after 15 days. The change in pH during the reaction was −0.26 (see FIG. 1). X-ray powder diffraction showed the product was 100% "Silicalite".

EXAMPLE 3

Resin in the $OH^-$ form was prepared as for example 1.

3.51 g sodium chloride and 5.62 g $Al_2(SO_4)_3 7H_2O$ were dissolved in a small amount of water in a pyrex beaker. 0.72 g $SiO_2$(CABOSIL M5,) was then added and the total amount of water present was made up to 54 g. Resin (100 g) was added to this mixture.

The overall composition of the reaction mixture was: 8333 g Resin.$5NaCl.Al_2(SO_4)_3.SiO_2.250H_2O$.

Reaction conditions: polypropylene bottles, stirred 150 rpm, 95° C.

The reaction was terminated after 5 days. The product was analysed by XRD and found to be Sodalite.

EXAMPLE 4

The resin used in example 3 was regenerated by passing 500 mls 1M NaOH down a column containing the resin. The resin was then washed with water. The reaction mixture was prepared in the same manner as for example 3 except that
1. 1.70 g sodium sulphate was used instead of the sodium chloride.
2. the total water added was 108 g. Reaction mixture composition: 8333 g resin.Na$_2$SO$_4$.Al$_2$(SO$_4$)$_3$.SiO$_2$.500H$_2$O Reaction conditions: as for example 3.

After 1 hour the pH was 12.9 showing the resin regeneration was adequate. Samples taken after 20 hrs, 44 hrs, and 168 hrs showed increasing amounts of crystalline material. Both Sodalite and Zeolite A were found. The reaction was terminated after 168 hours.

EXAMPLE 5

Dowex 1-XB (Cl) resin was converted to the OH$^-$ form as described in Example 1. 303.5 g of a 25% aqueous solution of tetraethylammonium hydroxide (TEAOH) was mixed with 130.5 g colloidal silica, Syton X-30 (Na$_2$O, 79.4SiO$_2$, 626H$_2$O). Next a solution of 20.3 g aluminium sulphate (Al$_2$O$_3$, 3SO$_3$, 16H$_2$O) in 130 g of water was stirred in. Finally 39 g of the resin in the OH$^-$ form was added and the mixture was crystallised at 105° C. The reaction was carried out in sealed polypropylene containers with stirring any losses due to evaporation being made up as necessary.

The reaction mixture composition was

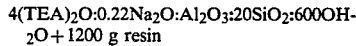

After 30 days reaction, the product obtained was about 75% zeolite Nu-2 and about 25% amorphous material. The Nu-2 zeolite was identified by X-ray diffraction analysis. This high-silica zeolite is described in European Pat. No. 55046.

These examples show that molecular sieves with completely different Si/Al ratios can be synthesised using resins as the sole source of base. Zeolite A has Si/Al=1 and "silicalite" typically has Si/Al>1000.

Examples 1 and 2 together with FIG. 1 show how the concentration and nature of anions in a mixture can be used to change the pH profile of a reaction.

We claim:

1. A method for the preparation of a crystalline zeolite material which comprises reacting an aqueous mixture comprising at least one source of silica and an ion exchange resin, and crystallizing the resulting zeolite material at a temperature no greater than the decomposition temperature of the ion exchange resin, said ion exchange resin maintaining the pH of the reaction mixture at a relatively constant level.

2. A method as claimed in claim 1 wherein the ion-exchange resin comprises an anion-exchange resin.

3. A method as claimed in claim 2 wherein the anion-exchange resin is in the OH$^-$ form.

4. A method as claimed in claim 3 wherein the reaction mixture comprises a source of silica, an anion-exchange resin in the hydroxide form and a quaternary ammonium compound.

5. A method as claimed in claim 2 wherein the anion-exchange resin is added to the reaction mixture during crystallisation of the zeolite.

6. A method for the preparation of a silicalite zeolite material as claimed in claim 1 which comprises reacting an aqueous mixture comprising a source of silica, a tetrapropylammonium compound and an anion exchange resin.

7. A method for the preparation of zeolite Nu-2 as claimed in claim 1 which comprises reacting an aqueous mixture comprising sources of silica and alumina, a tetraethylammonium compound and an anion-exchange resin.

8. A method as claimed in claim 1 wherein the ion-exchange resin comprises a cation-exchange resin.

9. A method as claimed in claim 8 wherein the reaction mixture also comprises a source of aluminium.

10. A method as claimed in claim 9 wherein at least some of the aluminium required in the reaction mixture is added in the cationic form bound to the cation-exchange resin.

11. A method as claimed in claim 1 wherein the ion-exchange resin comprises a mixture of at least one anion-exchange resin and at least one cation-exchange resin.